July 12, 1938.                    R. F. HILL                    2,123,676
                            COUNTERBALANCE DEVICE
                             Filed July 21, 1937
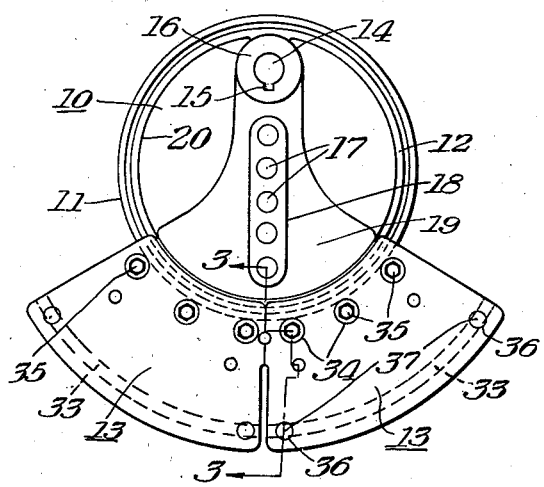
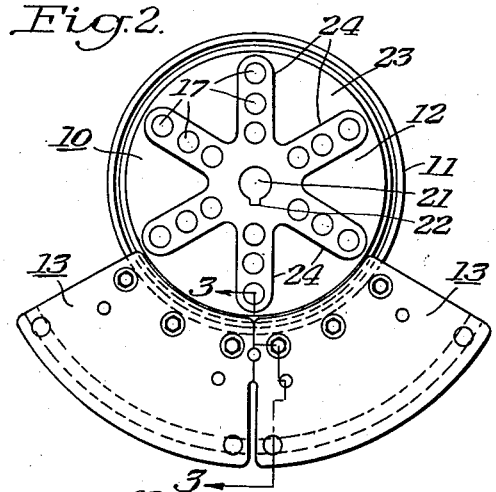
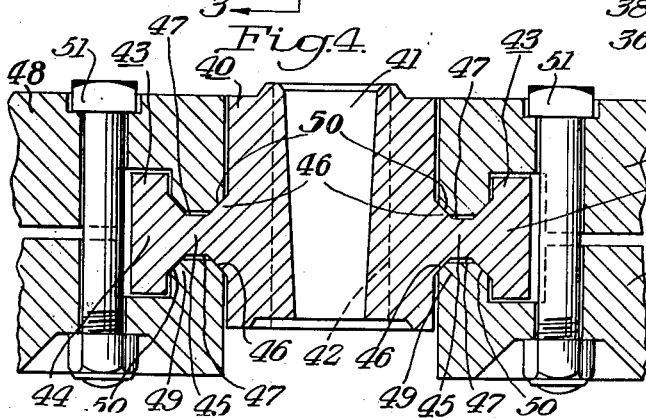
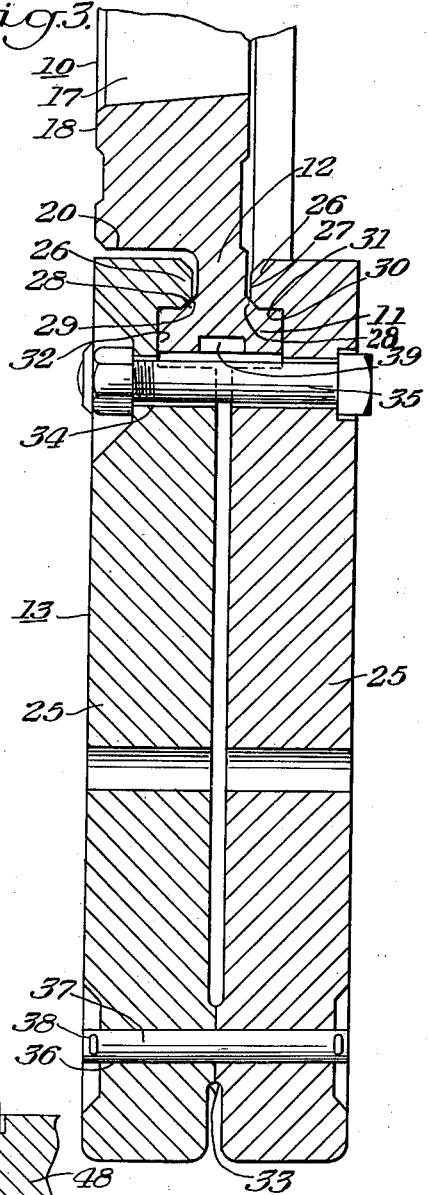
INVENTOR
Rowland F. Hill
BY
Edward A. Lawrence
his ATTORNEY Patented July 12, 1938

2,123,676

UNITED STATES PATENT OFFICE 2,123,676

COUNTERBALANCE DEVICE

Rowland F. Hill, Toledo, Ohio, assignor to The National Supply Company, Pittsburgh, Pa., a corporation of Pennsylvania Application July 21, 1937, Serial No. 154,746

2 Claims. (Cl. 74—593)

This invention relates generally to counterbalance devices for crank shafts of oil well drilling and pumping apparatus and more particularly to improvements in the construction of and manner of attaching counterbalance weights to their supports.

The principal object of this invention is the provision of a two-part counterweight structure and improved means for securing the same to a crank member adapted to be secured to a crank shaft of oil well drilling and pumping apparatus.

Another object is the provision of an improved circular disc-type crank and an improved radial type crank for pendulously and slidably supporting counterweights and for providing improved means for clamping the counterweights thereto.

Other objects and claimable advantages appear in the following description.

In the accompanying drawing wherein practical embodiments of the principles of this invention are illustrated:

Fig. 1 is a side elevation of an eccentrically mountable circular crank disc showing the counterweights attached thereto.

Fig. 2 is a side elevation on a concentrically mountable circular crank disc showing the counterweights attached thereto.

Fig. 3 is an enlarged sectional view taken on the line 3—3 of Figs. 1 and 2.

Fig. 4 is an enlarged cross sectional view showing the principles of the present invention applied to a radial crank arm with parts broken away.

Referring first to Figs. 1, 2 and 3, 10 represents a crank disc having a circular peripheral rim head 11 joined to the disc by the annular web 12. The rim and the web form a cross sectional T-shaped perimeter for securing the counterweights 13 to the disc.

Referring specifically to Fig. 1, 14 represents a transverse opening through the disc 10 for mounting the same on the end of a crank shaft of oil well drilling or pumping apparatus. This opening is provided with the keyway 15 for securing the crank disc to the shaft.

In this instance the crank shaft opening is positioned eccentrically of the polar axis of the disc, thereby providing unequal crank arms on each side of the center of rotation to which the counterbalance weights may be secured. This structure embodies what is known in the art as an eccentrically mounted circular crank disc or eccentrically mounted disc-type crank.

To provide structural reenforcement the crank shaft opening 14 is surrounded by the hub 16.

17 represents a series of openings the axial centers of which are in a common plane which includes the polar axis of the crank disc and the axis of the crank shaft opening. The openings 17 are tapered as illustrated in Fig. 3 and are arranged to receive wrist pins for the attachment of a pitman, a rod line connection or the like to the crank disc. These openings are included in the boss 18, the surface of which extends as far if not farther than the surface of the hub 16.

19 represents a reenforcing sector extending from the hub 16 and fanning to the rim of the inner disc portion 20 or to the base of the perimetral web 12, and disposed symmetrically of the boss 18.

Referring now to Fig. 2, 21 represents a transverse opening the axis of which is coincident with the polar axis of the disc 10 and which is arranged for mounting the disc on the end of a crank shaft. The opening 21 is provided with the keyway 22 for securing the crank disc to the shaft.

Since the crank shaft and the polar axis of the disc are coincident thereby providing equal crank arms around the center of rotation to which the counterbalance weights may be secured, this structure is defined as a concentrically mounted circular disc or concentrically mounted disc-type crank.

The disc 23, the outer perimetral edge of which terminates at the base of the web 12, is provided with the radial reenforcing bosses 24. A series of transverse openings 17 are disposed along the axes of each of these radially disposed bosses for the insertion of wrist pins to provide for the attachment of a pitman or a rod line connection to the crank disc.

The counterweight structure 13 for each of these types of crank discs is illustrated in Fig. 3. Each of these weights is made up of two complementary parts 25 which may be made as duplicate parts but preferably are made in complementary pairs to accommodate the assembling means. It has been found beneficial to form these weight parts so that their general contour is that of an arcuate sector as illustrated in Figs. 1 and 2, because the greater portion of the mass is farther from the center of rotation and the force of inertia developed thereby is more effective. This permits the use of a lighter weight mass for accomplishing the work desired.

The inner arcuate ends of the weight parts 25 are provided with an inturned arcuate flange 26 having the radial surface 27.

28 represents an angular fillet between the rim head 11 and the web 12, and the angular surface 29 on the end of the flange 26 is complementary thereto. The angular surface 28 has a three-fold purpose. It is arranged to reenforce the rim head 11 and to receive the balance of the weight clamping force together with the whole or part of the centrifugal load forces of the weights. Thus if clearance is provided between the web 12 and the radial surfaces of the flanges 26 so that when clamping the weight parts 25 to the disc the angular surface 29 must ride up the complementary angular surface 28 to permit the radial surface or the bottom of the groove 32 to engage the radial surface 32' of the head 11, then clearance will be provided between the surfaces 30 and 31, and the whole of the centrifugal force of the weights will be carried by the complementary angular surfaces 28 and 29, as shown in Fig. 3. This provides an improved manner of supporting the centrifugal load of the counterweights and furnishes a stronger and more reliable structure than if the T-shaped rim had no angular fillet.

On the other hand the radial surface of the web 12 and the surfaces 27, 28, 29, 30 and 31 may be so formed as to permit contact between each part thereof when the weight parts are clamped to the disc which would also provide an improved mode of securing the weights to the disc.

The adjacent faces of the body portion of the weight parts 25 are substantially parallel and are held in spaced relation at their inner ends by the thickness of the head 11 and adjacent their outer ends by the boss 33 on each weight part which extends in a cylindrical plane concentric to that of the flange 26 as indicated in dotted lines in Figs. 1 and 2.

The complementary weight parts 25 are provided with aligned holes 34 adjacent the grooves 32 for receiving the bolts 35 which hold the weight parts together and on the T-shaped rim of the disc when loose, thus permitting said weights to hang pendulously while the disc arm is rotated to the point where the weight or weights are to be clamped. When the bolts are tightened the complementary surfaces of the flanges 26 engage and grip the surfaces of the T-shaped rim, thereby securely locking the weight parts in the desired position on the rim of the circular crank disc.

The outer corners of the weight parts are provided with aligned holes 36 for receiving a bolt or pin 37 which functions to hold the weight parts together. In the instant case a pin is employed for this purpose which is provided with cotter keys 38 which hold the weight parts together. It is preferable that the aligned holes pass through the bosses 33 in the weight parts to prevent the bolts having any effect upon the spreading or clamping of the flanges 26.

A series of indentures or sockets 39 are provided in the outer peripheral surface of the rim head 11. These sockets may be used to jack the crank disc while adjusting the weights or for the insertion of locking blocks.

Referring now to Fig. 4, 40 represents a radial crank arm provided with one or more wrist pin holes 41 and the crank shaft opening 42 indicated in dotted lines. Each of the longitudinal edges of the crank arm 40 is integrally provided with a T-shaped rail section 43 comprising a head 44 and a web 45. The grooves at opposite sides which define the web portions are formed by the inwardly converging surfaces 46 connected at their inner ends by the flat surfaces 47.

48 represents the complementary parts of the two-part weights, said parts being provided with inturned flange portions 49. Said flanges are arranged to enter the grooves which define the webs 45 of the rail sections 43, and said flanges 49 are provided with surfaces 50 which are complementary to the surfaces 46 of the webs. Thus as the weight parts are clamped together by means of the bolts 51 engaging said weight parts, the mating complementary surfaces are forced into tight wedging engagement, thus rigidly attaching the weight to the radial crank arm.

It will be understood that this method of wedge attachment may be employed to mount weight parts upon the circular disc type of crank illustrated in Figs. 1, 2 and 3, and also that the method of attaching the weights disclosed in Figs. 1, 2 and 3 may also be employed to attach the weights to the radial crank arm shown in Fig. 4.

I claim:

1. In a counterbalance device for well pumping apparatus, the combination of a weight support arranged for mounting on a rotary crank shaft, a radially disposed T-shaped edge portion on said support forming extended grooves on opposite sides thereof, angularly disposed clamping surfaces in said grooves, a two-part counterweight, a continuous inturned flange on each of said weight parts forming oppositely disposed grooves in said weight parts, angularly disposed clamping surfaces on said flanges complementary to the angularly disposed clamping surfaces in the grooves of said support, the flanges and grooves of the weight parts forming a socket for receiving said T-shaped edge portion, means on said weight parts for holding them in assembled relation to permit their adjustment along the T-shaped edge portion of said support, and means for drawing said weight parts together creating frictional engagement between said complementary angularly disposed clamping surfaces to fixedly secure said weight parts at a selected position along the T-shaped edge portion.

2. In a counterbalance device for well pumping apparatus, the combination of a weight support arranged for mounting on a rotary crank shaft, a radially disposed T-shaped edge portion on said support forming extended grooves on opposite sides thereof, angularly disposed clamping surfaces in said grooves, a two-part counterweight, a continuous inturned flange on each of said weight parts forming oppositely disposed grooves in said weight parts, angularly disposed clamping surfaces on said flanges complementary to the angularly disposed clamping surfaces in the grooves of said support, the flanges and grooves of the weight parts forming a socket for receiving said T-shaped edge portion, means on said weight parts for holding them in assembled relation to permit their adjustment along the T-shaped edge portion of said support, and means for drawing said weight parts together creating frictional engagement between said complementary angularly disposed clamping surfaces to fixedly secure said weight parts at a selected position along the T-shaped edge portion, said angular clamping surfaces forming a wedge engaging seat preventing other portions of the weight parts from contacting said support.

ROWLAND F. HILL.